United States Patent
Porter

(10) Patent No.: US 6,570,595 B2
(45) Date of Patent: May 27, 2003

(54) EXCLUSIVE USE DISPLAY SURFACE AREAS AND PERSISTENTLY VISIBLE DISPLAY OF CONTENTS INCLUDING ADVERTISEMENTS

(75) Inventor: Swain W. Porter, Kirkland, WA (US)

(73) Assignee: Xoucin, Inc., Kirkland, WA (US)

( * ) Notice: Subject to any disclaimer, the term of this patent is extended or adjusted under 35 U.S.C. 154(b) by 0 days.

(21) Appl. No.: 09/344,409

(22) Filed: Jun. 24, 1999

(65) Prior Publication Data

US 2003/0052923 A1 Mar. 20, 2003

(51) Int. Cl.$^7$ ............................................. G06K 15/00
(52) U.S. Cl. ...................................... 345/802; 345/790
(58) Field of Search ................................ 345/791, 802, 345/760, 748–749, 796–797, 790, 794–795, 798, 801, 804, 806–807, 767, 744–747, 717–719, 543–544, 778; 348/552

(56) References Cited

U.S. PATENT DOCUMENTS

| | | | |
|---|---|---|---|
| 5,367,623 A | | 11/1994 | Iwai et al. |
| 5,617,526 A | | 4/1997 | Oran et al. |
| 5,812,132 A | | 9/1998 | Goldstein |
| 5,874,958 A | | 2/1999 | Ludolph |
| 6,016,144 A | * | 1/2000 | Blonstein et al. ............ 345/720 |
| 6,018,332 A | | 1/2000 | Nason et al. |
| 6,029,195 A | * | 2/2000 | Herz ........................... 709/219 |
| 6,141,010 A | * | 10/2000 | Hoyle ........................ 345/853 |
| 6,151,059 A | * | 11/2000 | Schein et al. ................. 348/13 |
| 6,323,911 B1 | * | 11/2001 | Schein et al. ............... 348/552 |
| 6,330,010 B1 | * | 12/2001 | Nason et al. ............... 345/802 |

FOREIGN PATENT DOCUMENTS

| | | |
|---|---|---|
| EP | 0 749 081 A1 | 12/1996 |
| JP | 11 167478 A | 6/1999 |

OTHER PUBLICATIONS

PCT International Application Published Under the PCT, WO 97/21183, published Jun. 12, 1997 (39 pages).

PCT International Application Published Under the PCT, WO 99/27517, published Jun. 3, 1999 (31 pages).

PCT International Search Report dated Nov. 9, 2000 for International Application No. PCT/US00/02568 (7 pages).

Patent Abstracts of Japan, vol. 1999, No. 11, Sep. 30, 1999.

* cited by examiner

*Primary Examiner*—Steven Sax
(74) *Attorney, Agent, or Firm*—Schwabe, Williamson & Wyatt, P.C.

(57) ABSTRACT

In a computer system having a display device with a display surface, a portion of the display surface is reserved for an exclusive use by a program, to allow contents rendered by the program to be persistently visible. In one embodiment, the reservation is accomplished through reducing the width and height of a shared portion of the display surface managed by a window manager, corresponding to a graphics resolution. In one embodiment, the exclusive use is to render advertisements in the reserved portion by an advertising rendering program. The advertisements are HTML pages received from an advertisement web server through the Internet. The HTML pages are rendered in the reserved portion through a direct draw component. The direct draw component is provided with the unreduced width and height as the width and height of the surface area to support direct drawing of displays. A cursor control device driver also supports monitoring of movements of a cursor control device and of occurrences of cursor events. The cursor control device driver is likewise provided with the unreduced width and height as the width and height of the surface area to monitor for cursor movements and events. In other embodiments, multiple portions of the display surface are reserved for advertising and/or other exclusive uses.

22 Claims, 9 Drawing Sheets

EXCLUSIVE USE DISPLAY SURFACE AREAS AND PERSISTENTLY VISIBLE DISPLAY OF CONTENTS INCLUDING ADVERTISEMENTS

BACKGROUND OF THE INVENTION

1. Field of the Invention

The present invention relates to the field of computer systems. More specifically, the present invention relates to exclusive use display surface areas, and their applications to persistently visible display of contents, such as advertisements.

2. Background Information

With advances in microprocessor and other related technology, today's computers are equipped with processing capabilities that were once the exclusive domain of large mainframe computers. To exploit these capabilities, today's computers are often equipped with multi-tasking operating systems that allow multiple tasks of the same or different applications to be executed at the same time. These operating systems are also typically equipped with windowing managers to manage the concurrent display of the execution results of the various tasks or applications through windowing, within the constraint of the available display surface of a display device. That is, the execution results of the various tasks/applications are rendered in corresponding display windows (hereinafter, simply windows), and these windows share the display surface. This employment of windows along with the use of iconic representations for various programs and "objects" is also often referred to as the desktop metaphor, with the shared display surface area being referred to as the desktop area.

Whether the contents rendered in the various windows are actually visible to a user depend on the relatively placement of the windows within the available display surface. Except for the top window (such as the "in focus" window or another window "rigged" to be "always on top") or windows that do not overlap with other windows (such as windows placed in a tile arrangement), contents of the underlying windows disposed in the overlapping portions are considered obstructed, and generally invisible, unless the top and other intermediate windows are considered "transparent". Contents disposed in the obstructed portions of these underlying windows become visible only when the window manager surfaces the window as the top window, typically responsive to a user request.

Many applications, such as Internet advertising, desire to have at least some of their rendered contents (in the case of Internet advertising, the advertisements themselves) persistently visible to the user. However, "rigging" the browser window to be "always on top" is not necessarily a viable option. Furthermore, in the case of Internet advertisement, even if "rigging" the browser window as "always on top" is a viable option, it still would not fully satisfy its persistent visibility desire. The reason is because most Internet advertisements are rendered in the form of banners, typically disposed at least at the top and at the bottom of a page. The banner advertisement placed at the bottom of a page is typically not visible when the page is first displayed, as the page is typically larger than the browser window. Similarly, the banner advertisement placed at the top of the page becomes invisible as the page is scrolled downward.

Thus, an improved approach to display management that better addresses the persistent visibility requirements of applications, in particular, the persistent visibility requirements of Internet advertising is desired.

SUMMARY OF THE INVENTION

In a computer system having a display device with a display surface, a portion of the display surface is reserved for an exclusive use, allowing contents rendered in the reserve area to be persistently visible. In one embodiment, the reservation is accomplished through reducing the width and height of a shared portion of the display surface managed by a window manager, corresponding to a graphics resolution. In one embodiment, the exclusive use is to render advertisements in the reserved portion by an advertising rendering program. The advertisements are HTML pages received from an advertisement web server through the Internet. The HTML pages are rendered in the reserved portion through a direct draw component. The direct draw component is provided with the unreduced width and height as the width and height of the surface area to support direct drawing of graphical displays. A cursor control device driver also supports monitoring of movements of a cursor control device and of occurrences of cursor events. The cursor control device driver is likewise provided with the unreduced width and height as the width and height of the surface area to monitor for cursor movements and events. In other embodiments, multiple portions of the display surface are reserved for advertising and/or other exclusive uses.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as display surfaces, windows, device drivers, and so forth, commonly employed by those skilled in the art to convey the substance of their work to others skilled in the art. Parts of the description will be presented in terms of operations performed by a computer system, using terms such as rendering, determining, reducing, transmitting, and so forth. As well understood by those skilled in the art, these quantities and operations take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1A:
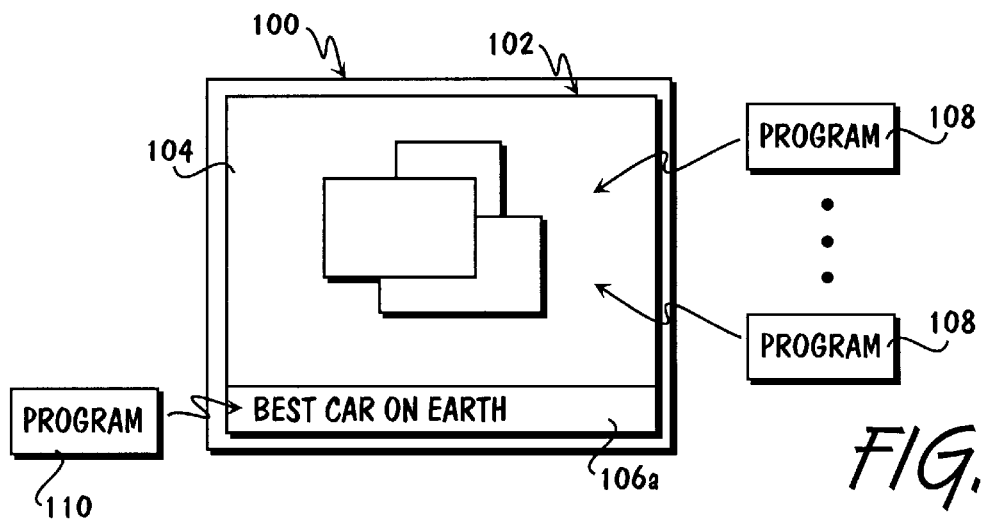
FIGS. 1a–1f illustrate an overview of the present invention, in accordance with six embodiments.
Figure 1B:
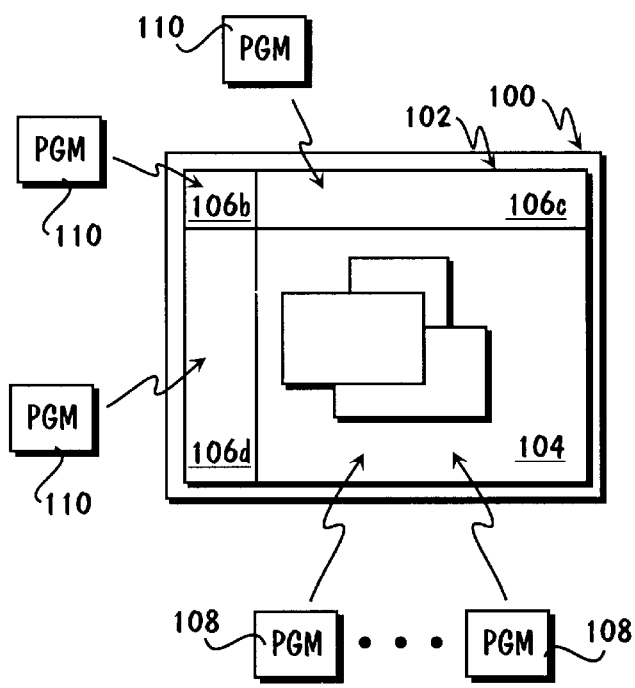
Figure 1C:
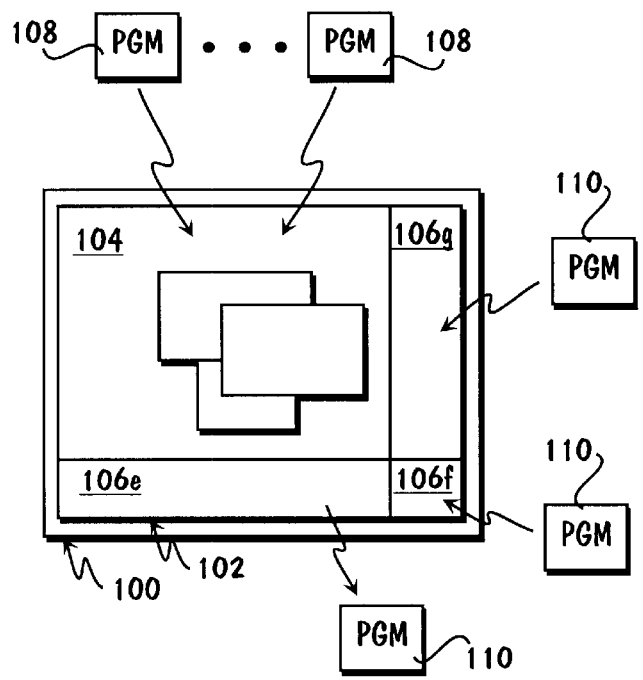
Figure 1D:
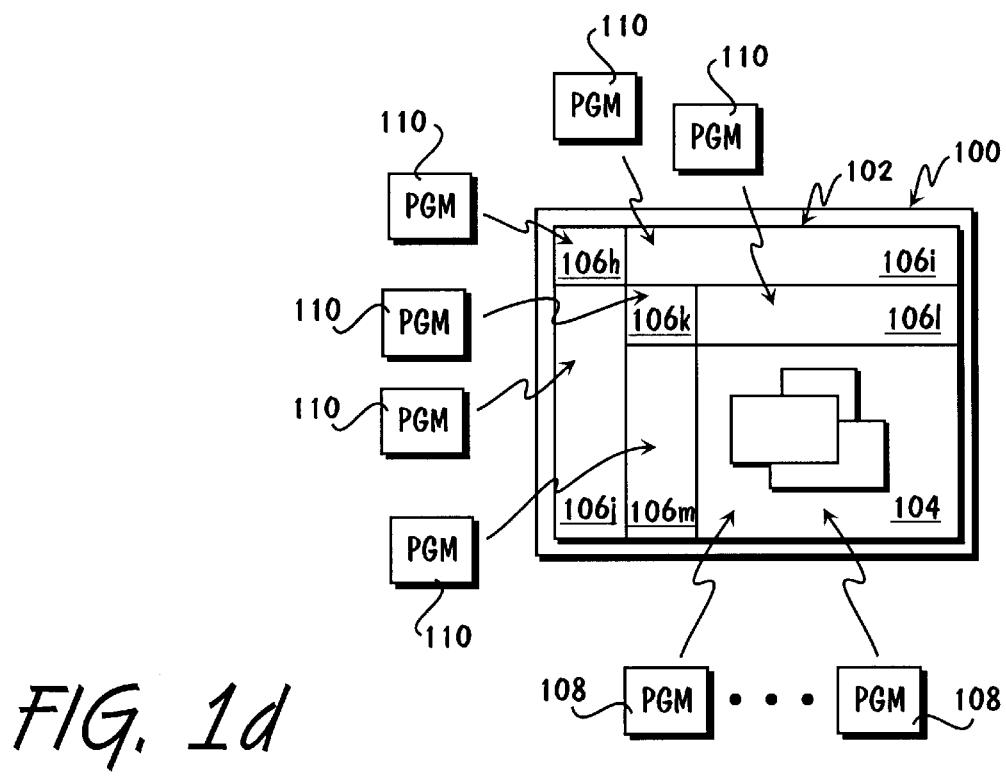
Figure 1E:
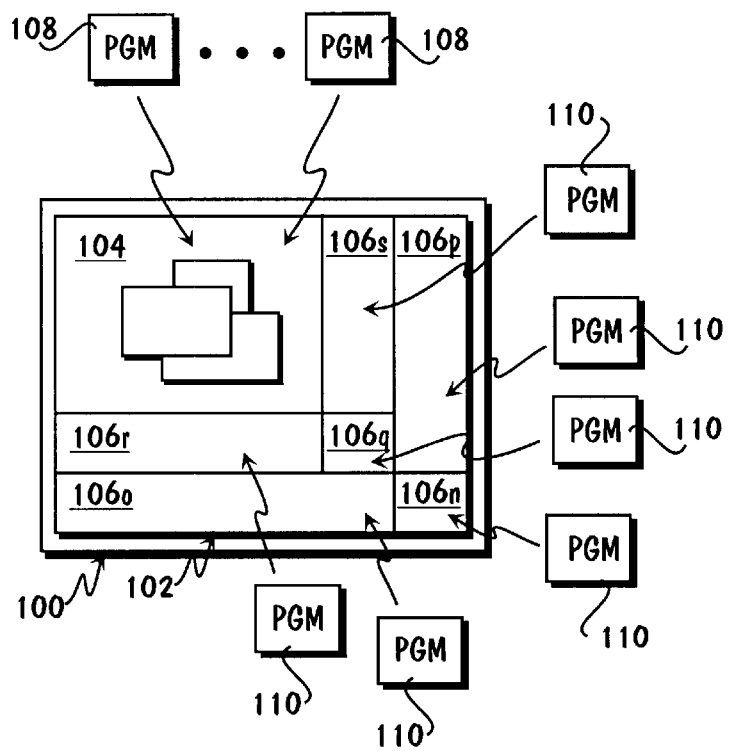
Figure 1F:
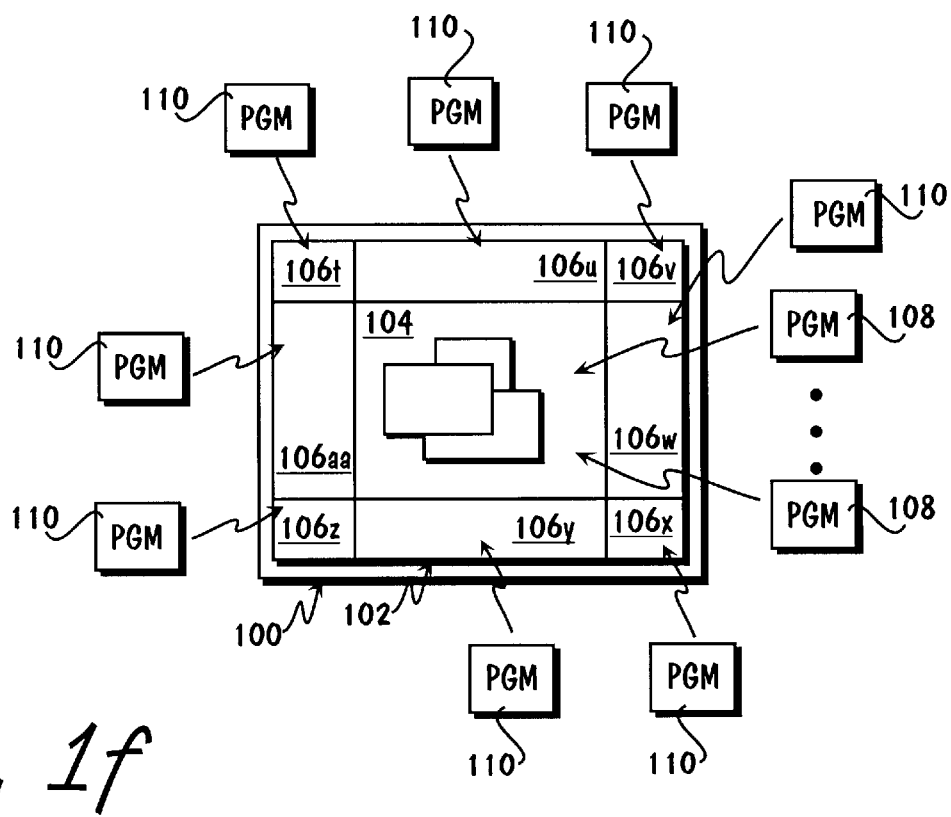

Referring now to FIGS. 1a–1f, wherein six block diagrams illustrating an overview of the present invention in accordance with three embodiments are shown. As illustrated, in accordance with the present invention, displace surface 102 of display device 100 (of a computer system) are divided into display areas 104 and 106a–106aa. Display area 104 is referred to as the shared display area (SDA), where any number of applications 108 (executing on the computer system or remotely, and of a display area sharing type) may render contents in their corresponding windows (disposed inside SDA 104). Display areas 106a–106aa are referred to as exclusive-use display areas (EDA), where only assigned applications 110 (executing on the computer system or remotely, and of an exclusive use type, in terms of display area) may correspondingly render contents into these areas. For FIG. 1a, one EDA 106a disposed along the bottom edge of display surface 102 is set aside or reserved. Whereas, in FIGS. 1b–1c, three EDAs 106b–106d and 106e–106g disposed along the left and top edges and along the right and bottom edges of displace surface 102 respectively, are set aside or reserved. In FIGS. 1d–1e, six EDAs 106h–106m and 106n–106s disposed in two rows along the left and top edges and along the right and bottom edges of displace surface 102 respectively, are set aside or reserved. Finally, in FIG. 1f, eight EDAs 106t–106aa disposed along the perimeter of displace surface 102 are set aside or reserved. As a result, contents rendered into EDAs 106a–106aa by applications 110 are persistently visible to an end-user, without resorting to prior art "rigging" techniques, such as "always on top". As will be described in more detail below, by selectively associating with an application 110, an application 108 may selectively render a portion of its output display in this persistently visible manner, thereby enabling applications (such as advertisement rendering), to overcome the prior art disadvantage of losing visibility to some of the rendered contents (such as banner advertisements), when the rendered contents (such as a displayed page), is scrolled up and down within a display window (such as a browser window).

These and other aspects of the present invention will be described more fully below. However, before doing do, it should be noted that while three embodiments of partitioning or setting aside or reserving exclusive-use display areas 106* were shown, from the descriptions to follow, those skilled in the art will appreciate that depending on how the coordinate system is implemented by the operating system of the computer system, some embodiments are more suitable for one operating system, while other embodiments may be more suitable for another operating system. Of course, other variations of partitioning or setting aside or reserving exclusive-use display areas may also be practiced. It should also be noted that each assigned application 110 may elect to employ multiple windows in rendering contents in its assigned EDA 106*. However, for ease of understanding, the remaining description will substantially be confined to the scenario where an unwindowed or single window approach is employed in each of the assigned EDA 106*. (The symbol * after reference number 106 stands for a "wildcard", which in this case may be any one of the letters "a" through "aa".)

Figure 2:
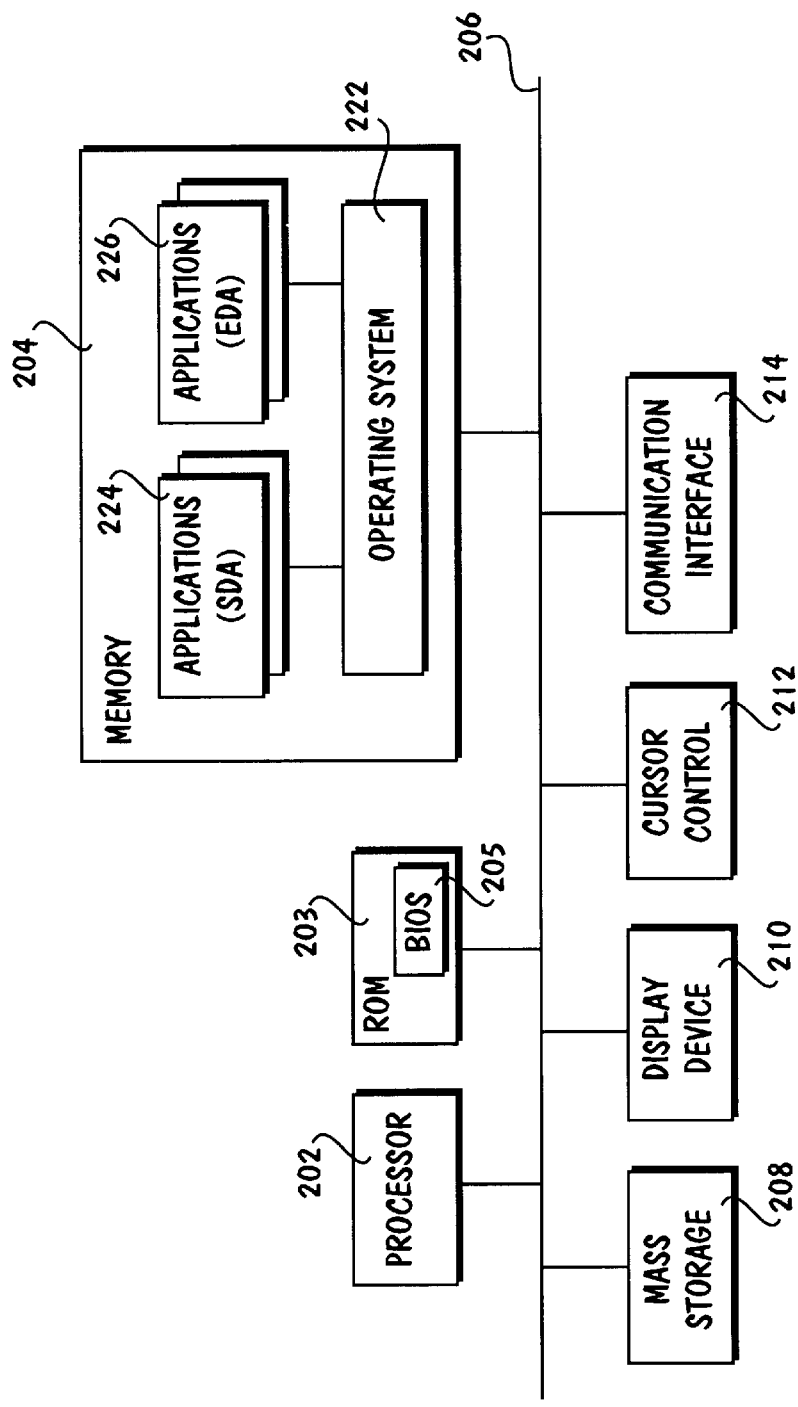
FIG. 2 illustrates an example computer system suitable for practicing the present invention.

Referring now to FIG. 2, wherein an example computer system suitable for practicing the present invention is shown. As shown, example computer system 200 includes processor 202, ROM 203, and system memory 204 coupled to each other via "bus" 206. Coupled also to "bus" 206 are non-volatile mass storage 208, display device 210, cursor control device 212 and communication interface 214. ROM 203 includes a basic input/output system (BIOS) 205. During operation, memory 204 includes working copies of operating system 222, applications 224 that use the shared display area (see FIGS. 1a–1f) of the display surface of display device 210, and applications 226 that use correspondingly assigned exclusive-use display areas (see FIGS. 1a–1f) of the display surface of display device 210. Operating system 222, applications 226, and in some embodiments, applications 224 are incorporated with the teachings of the present invention.

Except for the teachings of the present invention incorporated, each of these elements is intended to represent a wide range of these devices known in the art, and perform its conventional functions. For example, processor 202 may be a processor of the Pentium® family available from Intel Corporation of Santa Clara, Calif., or a processor of the PowerPC® family available from IBM of Armonk, N.Y. Processor 202 performs its conventional function of executing programming instructions of operating system 222 and applications 224–226, including those implementing the teachings of the present invention. ROM 203 may be EEPROM, Flash and the like, and memory 204 may be SDRAM, DRAM and the like, from semiconductor manufacturers such as Micron Technology of Boise, Id. Bus 206 may be a single bus or a multiple bus implementation. In other words, bus 206 may include multiple buses of identical or different kinds properly bridged, such as Local Bus, VESA, ISA, EISA, PCI and the like.

Mass storage 208 may be disk drives or CDROMs from manufacturers such as Seagate Technology of Santa Cruz of Calif., and the like. Typically, mass storage 208 includes the permanent copy of operating system 222 and applications 224–226. The permanent copy may be installed in the factory, or in the field. For field installation, the permanent copy may be distributed using article of manufactures with recordable medium such as diskettes, CDROM, DVD and the like, or downloaded from a distribution server through a data network (such as the Internet). The distribution server may be a server of the OEM, i.e. the software developer, such as Microsoft of Redmond, Wash., if an operating system of the Window® family is used, or a server of a publisher, such as Red Hat of City, State, if Linux is used instead.

Display device 210 may be monitors of any types from manufacturers such as Viewsonic of City, State. Cursor control 212 may be a mouse, a track ball and the like, from manufacturers such as Logictech of Milpitas, Calif. Communication interface 214 may be a modem interface, an ISDN adapter, a DSL interface, an Ethernet or Token ring network interface and the like, from manufacturers such as 3COM of San Jose, Calif.

As those skilled in the art will also appreciate, from the description the follow, the present invention may also be practiced without some of the enumerated elements, e.g. mass storage 208, or with additional elements, such as graphics accelerators, audio and video add-on cards, and so forth. Furthermore, while for ease of understanding, the term "applications 226" is used to refer to "applications" assigned to use the exclusive-use display areas, in alternate embodiments, through appropriate use of an "emulation interface", one or more of applications 226 may be another operating system instead.

Figure 3:
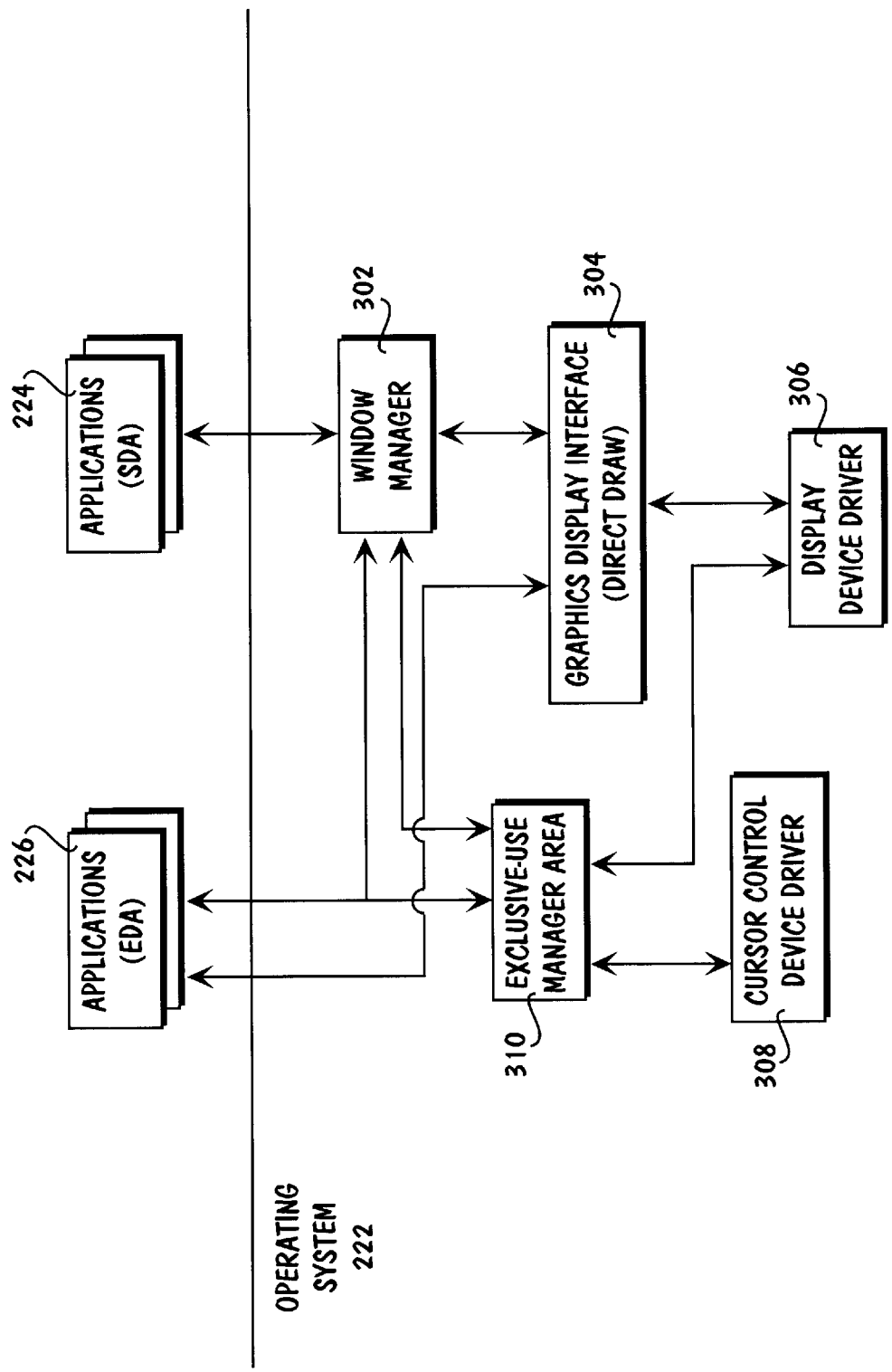
FIG. 3 illustrates the operating system of FIG. 2 in further details, and its interaction with the various applications, in accordance with one embodiment.

Referring now the FIG. 3, wherein a block diagram illustrating enhanced operating system 222 and its interactions with applications 224–226 is shown. As illustrated, operating system 222 includes conventional elements such as window manager 302, graphics manager 304, display device driver 306, and cursor control device driver 308. Each of these elements performs its conventional functions known in the art. That is, window manager 302 performs the conventional function of managing the current display of the various display windows of applications 224 in the SDA (see FIGS. 1a–1f). Graphics manager 304 performs the conventional function of rendering graphics objects for an application. Graphics manager 304 includes in particular, the capability of allowing an application to make direct draw onto the display surface of a display device. For example, for the Windows® operating systems, graphics manager 304 is intended to represent the Graphics Device Interface (GDI) and DirectX combined. (The two components are expected to be consolidated into a single component in GDI2K and beyond.) Display driver 306 performs the conventional function of controlling the display device, whereas cursor control device driver 308 performs the conventional function of monitoring movements of a cursor control device and cursor events (such as clicking or double clicking of a control button).

As illustrated, in accordance with the present invention, operating system 222 is also advantageously provided with exclusive-use display area manager 310. EDA manager 310 is employed to "coordinate" with window manager 302 to set up the shared and exclusive areas. Furthermore, EDA manager 310 is also employed to enable applications 226 to be able to correspondingly render contents into their assigned EDAs, and to respond to cursor device movements and events detected within their assigned EDAs. These and other aspects will be described more fully below with references to FIGS. 4a–4c.

Figure 4A:
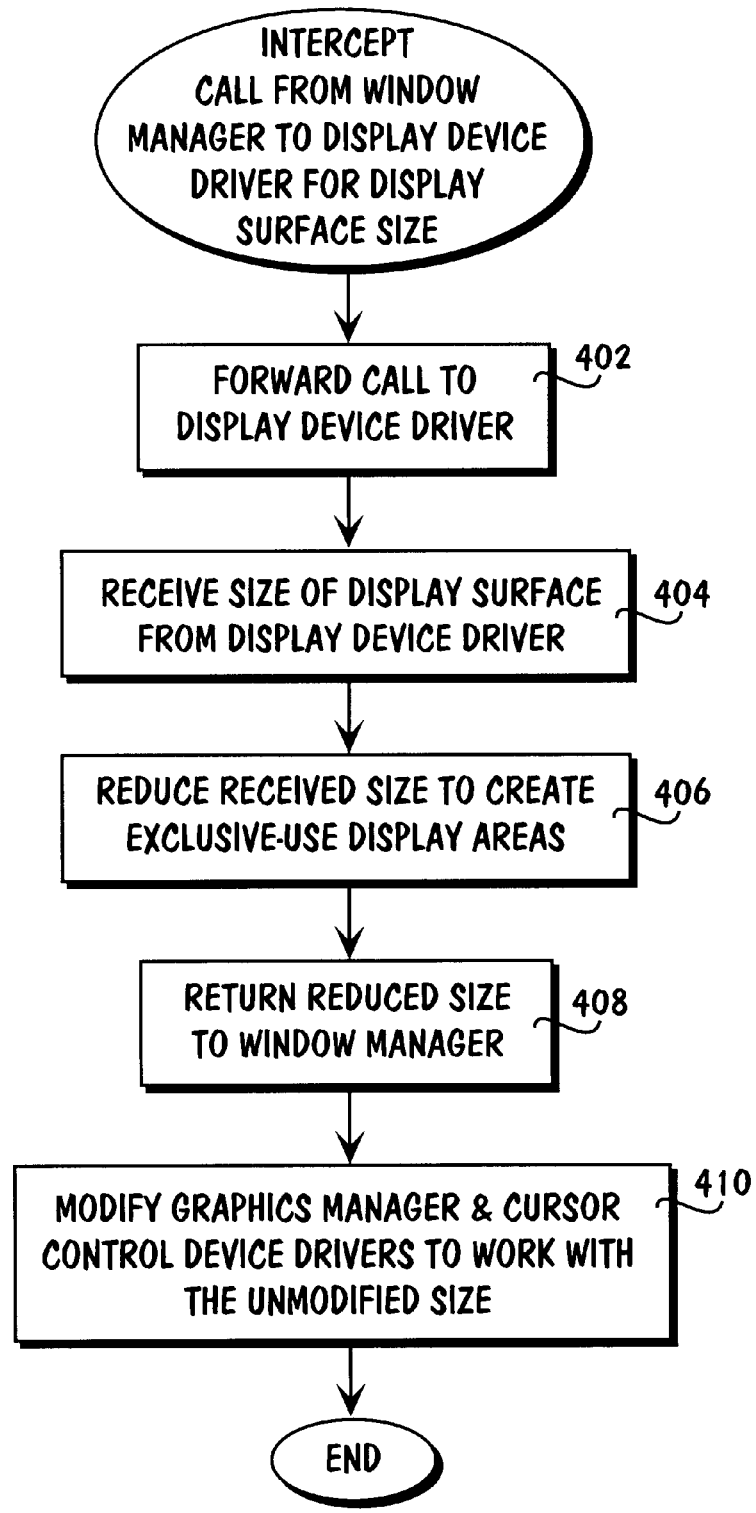
FIGS. 4a–4b illustrate various operational flows of the EDA manager of FIG. 3, in accordance with one embodiment.

FIG. 4a illustrates the operational flow of EDA manager 310 for "coordinating" with window manager 302 in setting up the shared and exclusive-use display areas, in accordance with one embodiment. As shown, for the illustrated embodiment, EDA manager 310 intercepts a call from window manager 302 to display device driver 306 to obtain the size of the display surface for the display device under the control of display device driver 306 for a particular graphics resolution. The interception or redirection to EDA manager 310 is accomplished in an operating system dependent manner. In one embodiment, where the operating system is of the Windows® family, the interception or redirection of the call is by modifying the registry and the system.ini file. For this embodiment, the call includes the graphics resolution, expressed in terms of a pixel resolution, e.g. 800×600 pixels.

Upon interception, at 402, EDA manager 310 forwards the call to display device driver 306. At 404, the display device driver 306 returns the size of the display surface of the display device under the control of display device driver 306 for the particular graphics resolution. In one embodiment, the size is expressed in terms of the width and height of the display surface. In one embodiment, the width and height are implicitly expressed in terms of maximum x and y coordinates. In one embodiment, where the operating system is of the Windows® family, the original of the x–y coordinate is by-definition the top left corner of the display surface.

For the illustrated embodiment, upon receipt of the size of display surface expressed in terms of width and height, at 406, EDA manager 310 reduces the width and height accordingly to set aside or reserve the EDA(s). In one embodiment, the number of EDA(s) to be created and the applications to be assigned to the various EDAs are specified through a configuration file, e.g. for an operating system of the Windows® family, through sections in the win.ini and system.ini files. Depending on the coordinate system of the operating system, multiple EDAs can be created with a single or successive operations of reducing the width and the height. For example, for the embodiment where the size is expressed in terms of maximum x ($x_{max}$) and maximum y ($y_{max}$) referencing an origin disposed at the top left corner of the display surface, the three EDAs of FIG. 1c may be created by reducing $x_{max}$ and $y_{max}$ to $x'_{max}$ and $y'_{max}$ where $x'_{max}$ and $y'_{max}$ are smaller than $x_{max}$ and $y_{max}$ respectively. EDAs 106f and 106g are the areas disposed along the bottom and the right edge of the display surface respectively, less the intersected area, which is treated as EDA 106e. Similarly, the six EDAs of FIG. 1e may be created by successively reducing $x_{max}$ and $y_{max}$ to $x'_{max}$ and $y'_{max}$, and $x''_{max}$ and $y''_{max}$, where $x'_{max}$ and $y'_{max}$ are smaller than $x_{max}$ and $y_{max}$, and $x''_{max}$ and $y''_{max}$ are smaller than $x'_{max}$ and $y'_{max}$ respectively. EDAs 106n–106s are the two rows of areas disposed along the bottom and the right edge of the display surface respectively. The successive reduction may even be performed through recursive invocation of a reduction function. In alternate embodiments, the allocation of the EDAs to applications 110 may be made dynamically instead, employing a resource allocation manager.

Upon reducing the size of the display surface, at 408, EDA manager 310 returns the reduced size to window manager 302, thereby "coordinating" the locations of the shared and exclusive-use display areas with window manager 302. In alternate embodiments, other expression of sizes as well as other coordinate systems may be employed. The manner in which the size is reduced, and the manner in which shared and exclusive-use areas are designated may simply be adjusted accordingly to the alternate approaches.

For the illustrated embodiment, it is assumed that upon receipt of the reduced size, window manager 302 also sets up graphics manager 304 and cursor control device driver 308 to operate with the same display surface information, i.e. the reduced size. Accordingly, at 410, EDA manager 310 overrides this information, restoring graphics manager 304 and cursor control device driver 308 to operate with the unreduced size, thereby allowing applications 226 to render contents into the EDAs through direct draw, and to be notified of detected cursor movements and events in the EDAs. Towards the later objective, at 412, EDA manager 310 also modifies the set up of cursor control device driver 308 such that event notifications of cursor movements and events are provided to EDA manager 310 instead of window manager 302, for EDA manager 310 to filter out the detected cursor movements and events in the EDAs before allowing the residual detected cursor movements and events (within the shared display area) to be passed on to window manager 310.

In one embodiment, window manager 302 attempts to establish the size of display surface at each system start-up/reset. Accordingly, the operations illustrated in FIG. 4*a* are performed at each system start-up/reset. Note that starting applications 110 assigned with the EDAs is a separate issue. These applications may be started as part of an auto start process at system start-up or they may be started on an as needed basis by a task manager or by other applications.

Figure 4B:
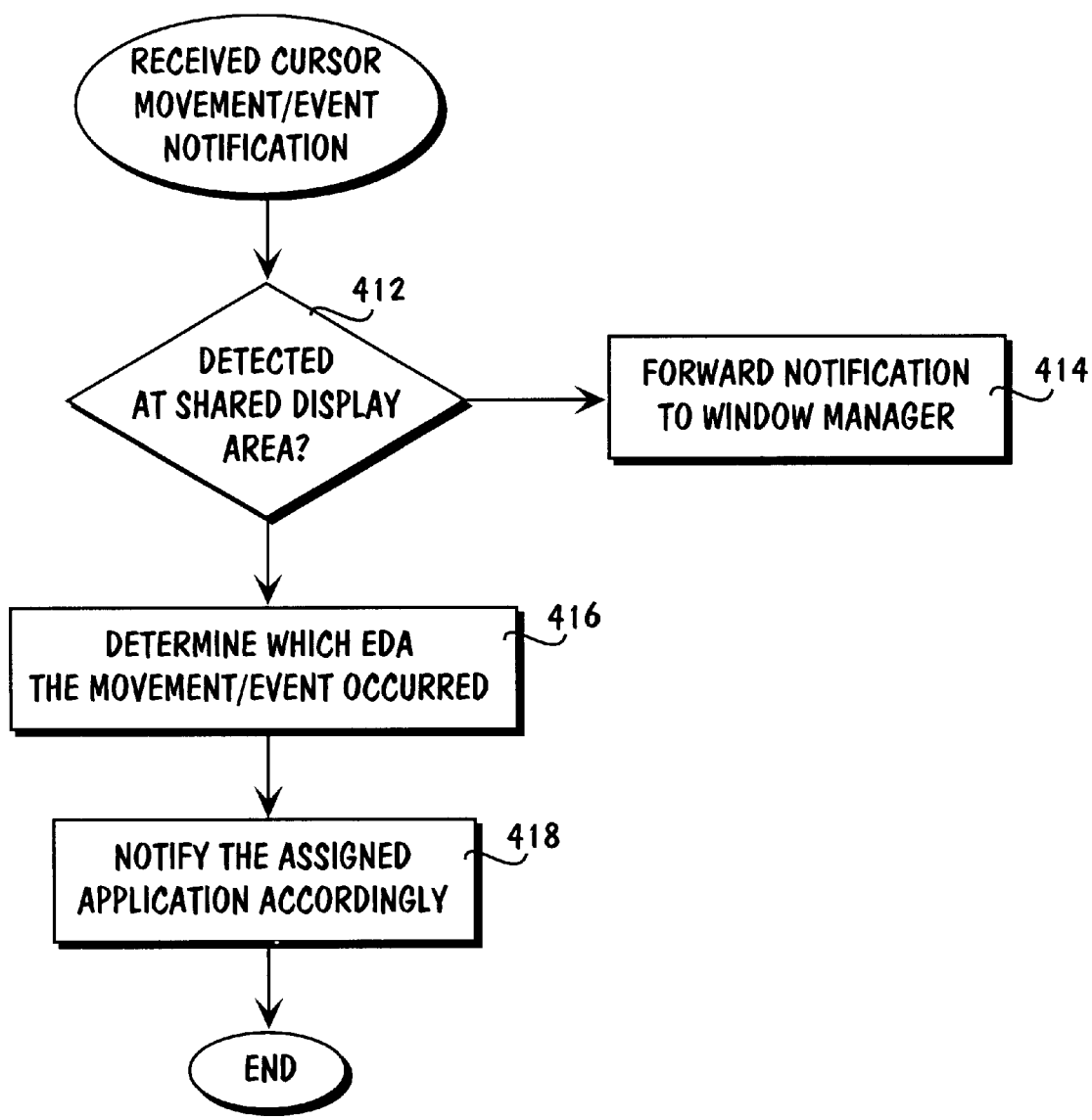

FIG. 4*b* illustrates the operational flow of EDA manager 310 for filtering cursor movement/event notifications, in accordance with one embodiment. Upon receipt of a cursor movement/event notification, at 412, EDA manager 310 first determines whether the movement/event was detected in the SDA or one of the EDAs. If the movement/event was detected in the SDA, at 414, EDA manager 310 forwards the notification to window manager 302. From there, operations proceed as in the prior art. On the other hand, if the movement/event was detected in one of the EDAs, at 414, EDA manager 310 determines within which EDA, the movement or event occurred. At 416, EDA manager 310 forwards the notification to the appropriate application 110 accordingly. The manner in which the notification is handled is application dependent.

Referring back to FIG. 3, as illustrated, whether it is for the initial content rendering, or for subsequent rendering, in response to e.g. a cursor movement/event notification, for the illustrated embodiment, an application 110 assigned with an EDA renders contents into its EDA through the direct draw feature of graphics manager 304. These operations, and the manner in which graphics manager 304 handles these requests are well known. Accordingly, they will not be further described.

Figure 5:
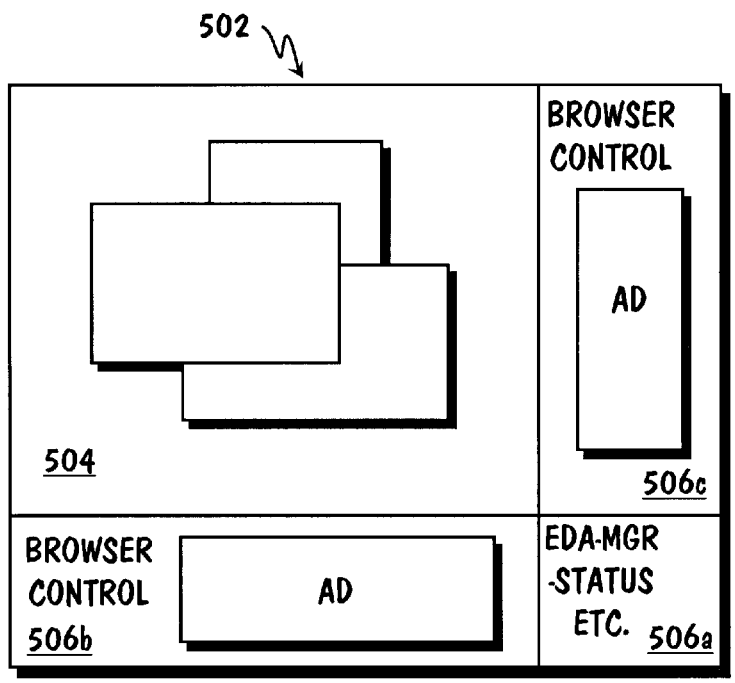
FIGS. 5–6 illustrate application of the present invention to advertisement rendering, in accordance with two embodiments.
Figure 6:
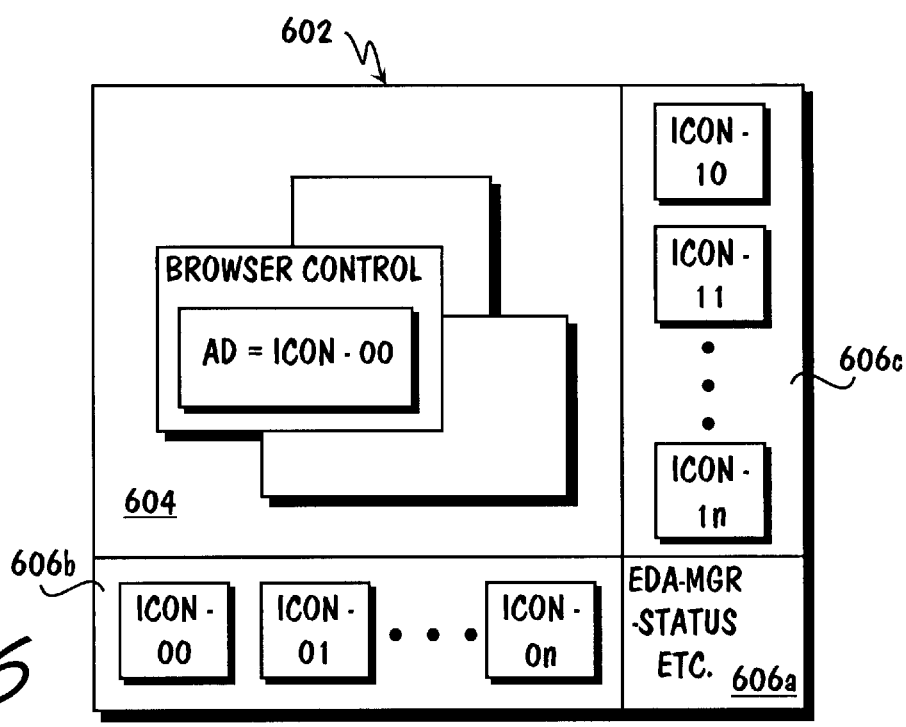

Referring now to FIGS. 5–6, wherein an example application of the present invention to rendering advertisement, in accordance with two embodiments are shown. As illustrated, both in FIGS. 5–6, EDA manager 310 assigns one of the EDAs, more specifically, EDA 506*a* or 606*a* disposed at the lower right corner of display surface 502, to display its identification signifying its presence and operation in the system, along with status and other control information. Additionally, for the illustrated embodiment, at least one of the applications 110 assigned with corresponding EDAs 506*b* and 506*c* or 606*b* and 606*c* is an advertisement rendering program for rendering advertisements (e.g. advertisements received from a remote server (such as a web server) through a data network (such as the Internet)).

For FIG. 5, it is assumed that the advertisements are constituted with Hypertext Mark-Up Language (HTML) pages, and each advertisement rendering program is an instance of a browser program, such as the Internet Explorer available from Microsoft or Navigator available from Netscape, recently acquired by America On-Line of Dulles, Va. By virtue of the browser's exclusive use of its assigned display area 506*b* or 506*c*, the advertisement rendered are persistently visible, independent of changes in the shared display area 504.

For FIG. 6, it is also assumed that the advertisements are also constituted with Hypertext Mark-Up Language (HTML) pages, however the advertisement rendering program assigned the EDA is merely a program that renders iconic representations for advertisements in the assigned EDA, e.g. trademarks or service marks of the advertisers.

The program, in response to a user selection of a corresponding displayed iconic representation of an advertisement, launches an instance of a browser program to render the advertisement in a conventional browser window 608 disposed in SDA 604. Although for this embodiment, the advertisements themselves are not persistently visible, but their iconic representations, by virtue of the program's exclusive use of the display areas, are persistently visible. Although not proportionally illustrated, EDAs 606*b* and 606*c* may be substantially smaller than EDAs 506*b* and 506*c*, thereby offering a compromised tradeoff of having a larger shared display area 604, and yet maintaining a small amount of persistently visible display areas 606*b*–606*c*.

Figure 7:
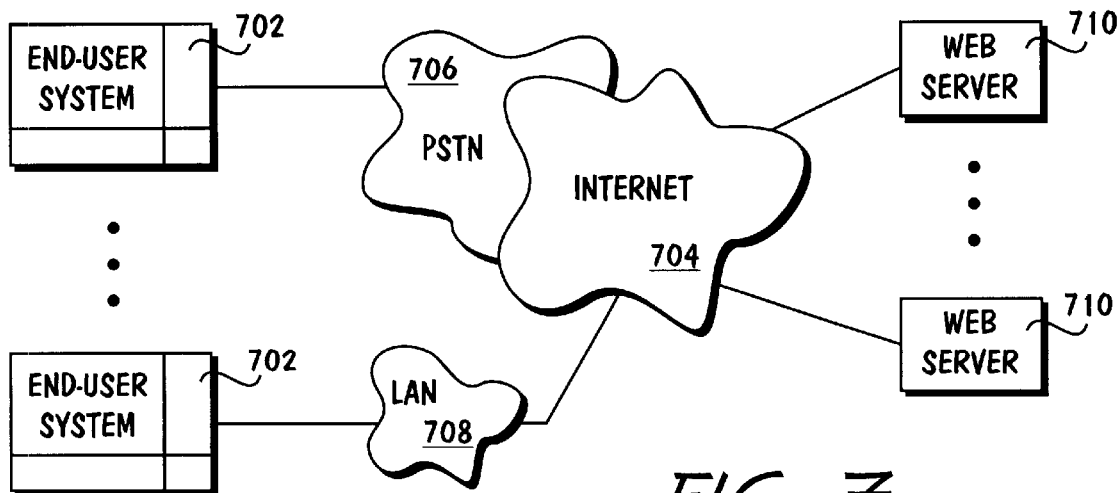
FIGS. 7–8 illustrate application of the present invention to Internet advertising in further details, in accordance with one embodiment.
Figure 8:
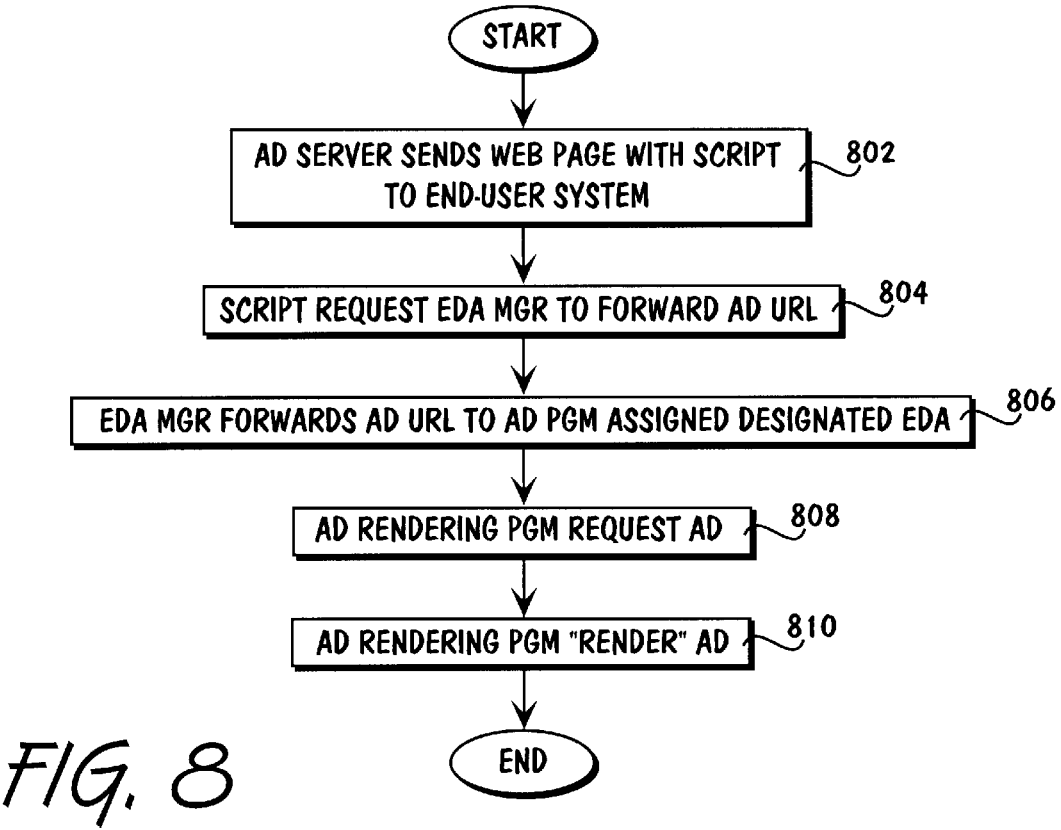

Referring now to FIGS. 7–8, wherein two block diagrams illustrating the example application of the present invention to advertising, more specifically, to Internet advertising, in further details, are shown. As illustrated, FIG. 7 is a network view of an improved approach to Internet advertising including end-user systems 702 incorporated with the teachings of the present invention set forth above, and web-based advertisement servers 710 equipped to exploit the presence of end-user systems 702 with persistent visibility provided through the present invention. End user systems 702 are coupled to the Internet 704, some through the conventional PSTN 706, while others through their private/public LAN 708.

FIG. 8 illustrates the operational flow of the Internet advertising method of the present invention, in accordance with one embodiment. As shown, at 802, server 710 transmits a web page to one of the end-user systems 702 in response to a "request" for the web page from the particular end-user system 702. As in the prior art, the request and response may be accomplished through e.g. an http connection that includes an URL denoting the web page or the particular server 710. In accordance with the present invention, the web page includes a script, e.g. a Javascript, that requests EDA manager 310 to provide an URL identifying one or more advertisements to an advertisement rendering program assigned to a designated exclusive-use display area, e.g. the EDA disposed along the bottom edge of the display surface. (The advertisement rendering program may be an embodiment of the FIG. 5*a* type or an embodiment of the FIG. 5*b* type, or embodiment of other like type.) Thus, upon receipt, at 804, the embedded script makes the request accordingly.

At 806, EDA manager 310 provides the URL to the advertisement rendering program assigned the designated EDA accordingly. In response, at 808, the advertisement rendering program opens another http connection to the specified resource location to retrieve the specified advertisements. Upon receipt of the advertisements, the advertisement rendering program renders the advertisements accordingly, as described above.

Thus, a method and an apparatus for creating exclusive-use display areas, and using them for persistently visible display of contents, such as advertisement, have been described.

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a computer system having a display device, a method of operation comprising:

reserving at least on start-up/reset, a first portion of a display surface of said display device available for use by an operating system to facilitate shared displays for exclusive use by a first program, the display device comprising said display surface available for use by the operating system, and a surface area not available for use by the operating system, surrounding the display surface available for use by the operating system, the display surface available having a width and a height, and said reserving comprising reducing at least a selected one of said width and said height to reduce the display surface that is actually available to the operating system, with said first portion occupying the remainder of the display surface otherwise available for use by the operating system; and rendering contents in said reserved first portion of the display surface, by said first program, excluding all other programs from using said reserved first portion of the display surface.

2. The method of claim 1, wherein said reserving further comprises determining said width and said height of said display surface available for use by the operating system, in accordance with a graphics resolution.

3. The method of claim 2, wherein said reserving further comprises intercepting a request from a window manager requesting determination of said width and height of the display surface, and forwarding said request to a device driver for said display device, the request including said graphics resolution; and said determination of the width and height for the display surface is performed by said device driver of said display device.

4. The method of claim 3, wherein said reserving further comprises receiving said determined width and height of said display surface from said device driver of said display device; and returning said determined width, if not reduced, or said reduced width, if reduced, and said determined height, if not reduced, or said reduced height, if reduced, to said window manager.

5. The method of claim 3, wherein the computer system further comprises a cursor control device having an associated device driver, and said reserving further comprises notifying said associated device driver of the cursor control device said unreduced initially determined width and height as the width and height of the display surface the associated device driver of the cursor control device is to monitor for cursor events, regardless of whether said determined width and height are reduced or not.

6. The method of claim 3, wherein the computer system further comprises a direct draw component for a program to draw directly on said display surface, and said reserving further comprises notifying said direct draw component said unreduced initially determined width and height as the width and height of the display surface, within which the direct draw component is to support direct draw, regardless of whether said determined width and height are reduced or not.

7. The method of claim 1, wherein said first program is an advertisement rendering program, and said rendering of contents comprises rendering of advertisements received from a remote server in said reserved first portion of the display surface.

8. The method of claim 7, wherein said rendering of advertisements in said reserved first portion of the display surface further comprises accessing said remote server to cause said advertisements to be provided.

9. The method of claim 8, wherein said accessing of the remote server comprises accessing a web server through the Internet.

10. The method of claim 7, wherein said received advertisements are constituted with HTML pages, and said rendering of advertisements in said reserved first portion of the display surface further comprises rendering said received HTML pages in said reserved first portion of the display surface through a direct draw component of the computer system, where the direct draw component is equipped to render display directly onto said display surface of said display device.

11. The method of claim 7, wherein said received advertisements are constituted with HTML pages, and said rendering of advertisements in said reserved first portion of the display surface further comprises rendering an iconic representation of said received HTML pages in said reserved first portion of the display surface through a direct draw component of the computer system, where the direct draw component is equipped to render display directly onto said display surface of said display device, and rendering said received HTML pages in a display window disposed in the unreserved shared portion of the display surface responsive to an user selection of the iconic representation of the advertisement.

12. The method of claim 1, wherein the method further comprises receiving notifications of occurrences of cursor events in said reserved first portion of display surface; and responding to said cursor events.

13. The method of claim 1, wherein said first reserved portion is disposed at an edge of the display surface.

14. The method of claim 13, wherein said first edge is a bottom edge.

15. A computer system comprising:

a display device comprising a display surface available for use by an operating system, and a surface area not available for use by the operating system, surrounding the display surface available for use by an operating system;

a first device driver to render displays on the display surface of the display device available for use by the operating system, and to indicate a width and a height of the display surface available for use by the operating system for a graphics resolution;

an operating system communicatively coupled to the first device driver to facilitate shared displays on said display surface available for use by the operating system; and a partitioning mechanism communicatively coupled to the first device driver and the operating system to generate at least a selected one of a reduced width and a reduced height, and to return the width, if unreduced, or the reduced width, if reduced, and the height, if unreduced, or the reduced height, if reduced, to the operating system requesting for the width and height of the display surface available for use by the operating, to reserve at least on start-up/reset, a first portion of the display surface otherwise available for use by the operating system for the exclusive use of a first program, the first portion being the remainder of the display surface otherwise available for use by the operating system.

16. The computer system of claim 15, wherein the computer system further comprises a second device driver to monitor and report movements of a cursor control device, including occurrences of cursor control events; and the partitioning mechanism is further communicatively coupled to the second device driver to notify the second device driver of the unreduced width and height as the width and height of the display surface of the display device the second device driver is to support, regardless of whether the operating system is provided with the reduced width and/or height or not.

17. The computer system of claim 15, wherein the computer system further comprises a direct draw component communicatively coupled to the first device driver to support direct drawing of displays on said display surface of the display device; and the partitioning mechanism is further communicatively coupled to the direct draw component to notify the direct draw component of the unreduced width and height as the width and height of the display surface of the display device, within which the direct draw component is to support, regardless of whether the operating system is provided with the reduced width and/or height or not.

18. The computer system of claim 15, wherein said first program comprises an advertisement program that renders remotely retrieved advertisements in said first portion of the display surface, excluding all other programs from usage of the first portion of the surface to render displays.

19. The computer system of claim 15, wherein said first program comprises an advertisement program that renders iconic representations of remotely retrieved advertisements in the first portion of the surface, excluding all other programs from usage of the first portion of the surface to render displays, the advertisement program rendering the retrieved advertisements in the unreserved portion of the display surface under the facilitation of the operating system, responsive to user selections of corresponding ones of the rendered iconic representations.

20. An operating system comprising:

a first device driver to render displays on a display surface of a display device and to indicate a width and a height of the display surface for a graphics resolution;

a window manager to facilitate shared displays on said display surface; and a function communicatively coupled to the first device driver and the window manager to post process a width and height indication by the first device driver to generate a reduced width and/or a reduced height to reserve a first portion of the display surface for the exclusive use of a program.

21. The operating system of claim 20, wherein the operating system further comprises a second device driver to monitor and report movements of a cursor control device, including occurrences of cursor control events; and the function is further communicatively coupled to the second device driver to notify the second device driver of the unreduced width and height as the width and height of the display surface of the display device the second device driver is to support, regardless of whether the window manager is provided with the reduced width and/or reduced height or not.

22. The operating system of claim 20, wherein the operating system further comprises a direct draw component communicatively coupled to the first device driver to support direct drawing of graphical displays on said display surface of the display device; and the function is further communicatively coupled to the direct draw component to notify the direct draw component of the unreduced width and height as the width and height of the display surface of the display device, within which the direct draw component is to support, regardless of whether the window manager is provided with the reduced width and/or reduced height or not.

* * * * *